Patented Nov. 19, 1935

2,021,162

UNITED STATES PATENT OFFICE 2,021,162

APPARATUS FOR STEREOSCOPIC PICTURE RECORDING, REPRODUCING, AND THE LIKE

George William Walton, London, England

Application March 10, 1932, Serial No. 598,074. In Great Britain February 19, 1931. Renewed February 9, 1935

3 Claims. (Cl. 88—16.6)

The present invention relates to stereoscopic picture recording, reproducing and the like and to apparatus therefor.

The invention provides improved means for forming multiple pictures such as can be used for producing stereoscopic or natural colour effects in picture recording or reproducing and also in television and the like.

The invention makes use of optical means which can produce, from an object, that kind of image which will be referred to as a stixograph, in which all the elemental areas of the object are deployed in such a manner that they do not overlap one another regarded in at least one direction in the surface in which the stixograph is formed. Where the line of deployment is not greatly curved therefore, there can be drawn, in at least one direction, parallel lines each passing through not more than one of the elemental areas. Usually the optical means are such that, in the image, adjacent lines of the object are longitudinally displaced relatively to one another.

Methods and means for producing stixographs from two dimensional images, and vice versa, are described in my patent specifications, Serial Nos. 400,883, filed October 19, 1929 and 426,344, filed February 6, 1930.

According to the present invention, there are provided optical means adapted to produce a plurality of stixographs from an object.

For some purposes the stixographs are two in number and represent stereoscopically related view points of the object and for other purposes the stixographs, two or more in number, are formed in different colours. The stixographs are intermixed, that is to say, portions of one stixograph are interposed between portions of another.

In order that the invention shall be more clearly understood, it will be described making reference to the accompanying drawings, in which.

Figure 1:
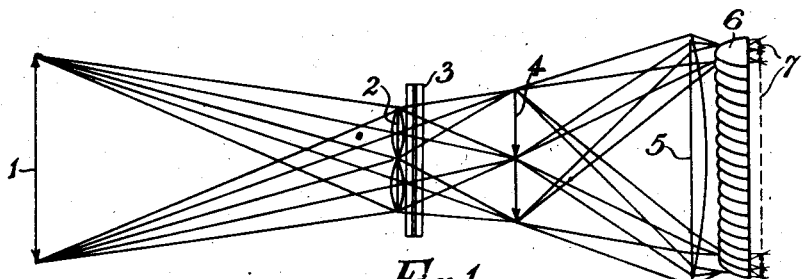
Fig. 1 shows a plan view of the optical arrangement for producing double intermixed stixographs.
Figure 4:
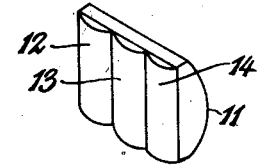
Figure 7:
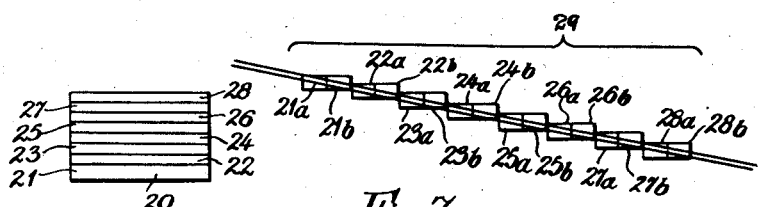
Figure 5:
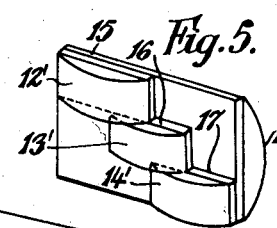
Figure 8:
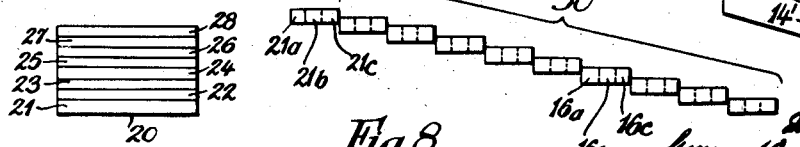
Figure 6:
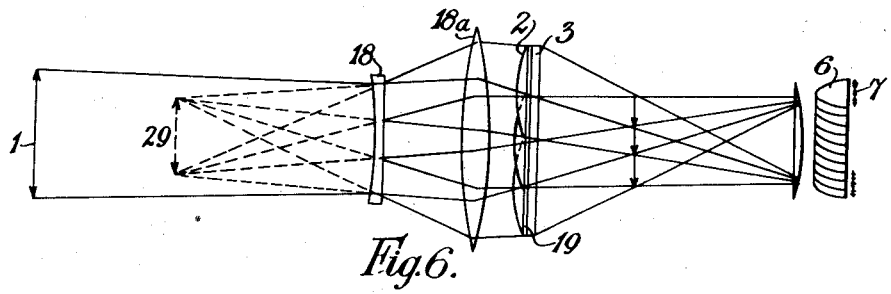

Fig. 4 snows another form of multiple object lens,

Fig. 5 shows a multiple object lens for natural colour pictures,

Fig. 6 shows a modification of Fig. 1 when using the object lens of Fig. 5,

Fig. 7 shows the relation between a double stixograph and a normal picture,

Fig. 8 shows the relation between a triple stixograph and a normal picture.

In Fig. 1 which shows a plan view of the optical arrangement, an object 1 is viewed by an object lens system 2 and 3 consisting of a portion 2 in the form of two cylindrical lenses side by side with their axes at right angles to the plan view, and a portion 3 consisting of one cylindrical lens with its axis at right angles to the axes of 2. Images which are produced by cylindrical lenses will be referred to for convenience as cylindrical images. As the portion 3 has no optical power in the dimension shown in Fig. 1, the portion 2 will form a real image of the object 1 at 4.

This image is of course only focussed in the plane of the paper in Figure 4. The image will, however, be double, one image being formed with each of the components of 2.

Figure 2:
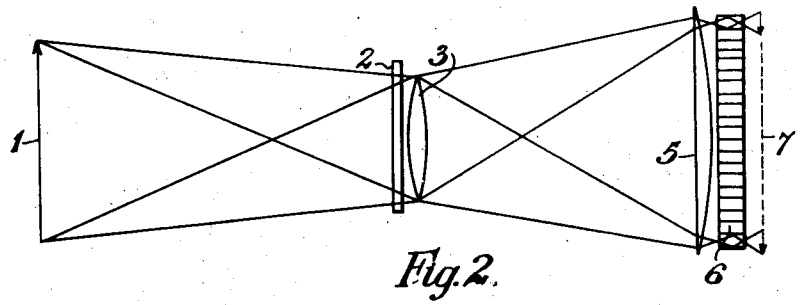
Fig. 2 shows a side elevation of Fig. 1.

In order to explain the action of the echelon device 6 the operation of the apparatus will first be described assuming that only one lens is used at 2. The echelon device 6 is of the type fully described in applications Serial Nos. 400,883 and 426,344 referred to above, and comprises a number of lenticular laminae arranged in staggered formation with their axes parallel to one another. The number of laminae is chosen according to the detail required. Each lamina views the image at 4 through a field lens 5 and will form at 7 a real image of the image at 4. Each lamina will therefore form an image of one line of the object 1. So far as the plane of Fig. 2 is concerned, which is a side elevation of the arrangement of Fig. 1, the lens portion 2 has no power and the portion 3 views the image 1 forming through the field lens 5 a real image on the front surface of the echelon 6. Thus so far as the plane of Fig. 2 is concerned, all light entering each lamina is confined to that lamina by total internal reflection and the brightness of the emerging light will be an average of the light entering the lamina. The effect of this is that each lamina produces at 7 an image of a line, say a horizontal line, of the object and this "line image" is such that the density or brightness in each vertical band of the line image is uniform and representative of the average density or brightness of the corresponding part of the object 1. Owing to the staggering of the lamina the line images are displaced longitudinally relatively to one another and the amount of stagger is made such that the line images do not overlap one another in a direction at right angles to their lengths. By arranging that the lenses 2, 5 and 6 together focus an image at 7 and that the lenses 3 and 5 together focus an image at the entrant surface of the echelon 6, the images of elemental areas of the object appearing in the stixograph will be focussed in the plane of Figure 1 and will be without definition in the plane of Figure 2. Since the brightness of the line images perpendicular to their lengths is uniform (on account of the absence of definition in this direction) and since these images do not overlap one another, each line image can be enlarged to any desired extent in a direction perpendicular to its length without altering its function as an image representative of the object 1. Each strip of the object may be regarded as composed of a single row of elemental areas and, in the line image, each of these elemental areas is represented by a line or narrow strip perpendicular to the length of the line image and of any desired length.

One advantage of these line images or stixographs in television is that it is only necessary to scan the stixograph in one direction (approximately in the direction of the line images) and in one complete traverse of the line image in one direction, the whole of the original object will have been scanned. Further the rate of scanning is very small compared with normal television systems because it is only necessary to scan the stixograph say twenty times per second.

In cinematography, the stixograph is focussed upon a sensitive film which is moved continuously in a direction approximately perpendicular to the direction of the line images. Each elemental area of the stixograph then traces on the film a line parallel to the direction of motion thereof. If the particular elemental area remains of constant brightness then the line traced will be of constant brightness. If the brightness of the area changes (for example due to movement of the object) then the brightness of the line traced will change. It will be noted that the position of any elemental area in the object is represented in the stixograph by the position, transverse to the length of the film, of the line representing that elemental area. The dimension parallel to the length of the film is the time dimension. This arrangement has many advantages one of which is that the reproduction of moving scenes is truly continuous and not, as in normal systems, dependent upon a succession of independent pictures.

In reproducing a normal two-dimensional picture from a stixograph, apparatus similar to that shown in Figures 1 and 2 is used inversely, the illuminated stixograph being arranged at 7 and the two dimensional image being formed at 1.

Referring now to the actual arrangement according to the present invention shown in Figs. 1 and 2, where the lens system 2 is double, the stagger of the laminae in the echelon 6 is made greater than in the case above described and each lamina then produces two line images, side by side, of each line of the object 1. The form of these double stixographs will be described more fully later in connection with Figure 7.

It will be appreciated that the apparatus may be of any type capable of forming a stixograph, the only difference over the apparatus disclosed in my above mentioned applications being in that portion of the object lens, which forms, or takes part in the formation of the cylindrical images (preferably those which are parallel to those formed by the steps of the echelon device) and this difference consists in that portion, i. e. 2 in Figs. 1 and 2 being a multiple lens. This lens may be double, triple, or in fact any number of lenses according to the multiplicity of the picture required. For stereoscopic work it will be double, and for natural colour purposes it will generally be triple. The manufacture of this multiple lens can be accomplished in any of a number of ways, for instance as shown in Figs. 3 and 4.

Figure 3:
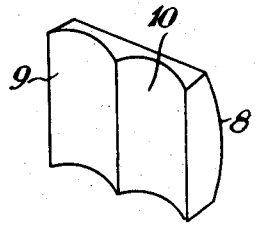
Fig. 3 shows a form of double object lens.

In Fig. 3 the object lens comprises the portions 2 and 3 of Fig. 1, and consists of one lens, one surface of which has a single cylindrical curvature 8, and the other surface has two cylindrical curvatures 9 and 10, the axes of 9 and 10 being preferably at right angles to that of 8.

Fig. 4 shows a cemented arrangement consisting of a portion 11, which is plano-cylindrical, and three portions 12, 13 and 14, also plano-cylindrical, the portions 12, 13 and 14 having their plane surfaces cemented to the plane surface of 11 in such a manner that the axes of 12, 13 and 14 are preferably at right angles to that of 11.

It will be appreciated that the invention is by no means limited to the particular form of object lenses described, for any combined arrangement of lenses having the effect of a single cylindrical lens with its axis parallel to the laminations of the echelon device shown in Figs. 1 and 2 and acting together with any number of separate lens systems, displaced from each other in directions substantially parallel to the axis of the first single lens and each having the effect of a cylindrical lens with its axis substantially at right angles to the axis of the first single lens, may be used to accomplish the purposes of this invention.

Fig. 5 shows in plan view a multiple object lens for the purpose of obtaining the transmission, reception, recording and reproduction of pictures in natural colours of a type similar to that shown in Fig. 4, having a single lens 11, and three lenses 12', 13' and 14' at right angles thereto. In this case however, the lenses 12', 13', and 14' are in echelon and natural coloured filters are interposed between 11 and 12', 13' and 14', for instance a red filter 15, between 12' and 11, a green filter 16 between 13' and 11, and a blue filter 17 between 14' and 11, so that each of the lenses 12', 13' and 14' will form an image in one colour only, the whole arrangement being cemented or clamped together in any convenient way.

The object lens of Fig. 5 may be used in the arrangement shown in Figs. 1 and 2, or any similar arrangement, but in such a case a picture recorded and reproduced will have both stereoscopic and natural colour characteristics, and therefore if required only for natural colours, it is preferable to use an arrangement as shown in the plan view in Fig. 6.

In Fig. 6 an additional lens combination 18 and 18a is used, which forms a vertical virtual image of a real image 1, which is viewed through the lens 18 by the lenses 2 and 3 of a type similar to the form shown in Fig. 5, to form a triple image, which is then viewed by the echelon device 6 to form a multiple one dimensional image at 7. The lens 2 is shown as an echelon lens of Fig. 5 and echelon devices of two or three steps (generally the maximum required in practice) may always be used in forming multiple images, for the lens 3 integrates light from all the steps so that each lamination of 6 receives light from each image.

The arrangements of Figs. 1, 2 and 6 have been shown as producing a stixograph image from an object 1, but it will of course be understood that the reverse process of converting a multiple stixograph into a normal picture can be accomplished by the same or similar means.

In order that the nature of the multiple stixographs formed according to this invention shall be more clearly understood, Fig. 7 shows at 20 a normal two dimensional picture divided into eight strips 21, 22, 23, 24, 25, 26, 27 and 28, and 29 shows the multiple stixograph equivalent of 20, from which it will be seen that the strip 21 appears in the stixograph as two adjacent sections 21a and 21b, and similarly all the other strips of 20, producing two intermixed pictures, the first consisting of all the a sections, and the second consisting of all the b sections. In Fig. 8 is shown a triple stixograph, where 20 is again a normal picture divided into strips and 30 is the multiple stixograph, but in this case each strip, such as 21 of 20, appears in 30 as three adjacent sections 21a, 21b and 21c. Similarly with all the strips in 20, so that 30 consists of three intermixed pictures of 20, all the a sections forming one picture, all the b sections another and the c sections a third picture, and therefore it is possible readily to arrange that the a picture shall correspond to a red picture of 20, the b picture to a green picture of 20, and the c picture to a blue picture of 20, so that a normal picture in natural colours may be reconstructed by the use of 30, and suitable arrangements for projection.

It will be noted that the apparatus according to the present invention is such that there is required only one echelon device containing laminae equal in number only to the number of strips into which it is desired to analyze the object. Each lamina forms a multiple image of the particular strip of the object with which it deals, so that the echelon device itself is identical with that which would be used for forming a single stixograph with the same degree of definition. The invention is therefore of great advantage in obviating the multiplication of the echelon device.

The invention has many applications in television picture telegraphy and cinematography where stereoscopic or natural colour reproductions of pictures are required. For instance, in television stereoscopic reproductions are important, when it is desired to visually supervise some distant scene, and it will not always be necessary to have specially constructed apparatus, for single picture transmitters and receivers may be quickly modified for stereoscopic work by exchanging a single object lens system for a double object lens, the remainder of the apparatus and the methods of transmission and reception remaining the same as for single picture work. The optical arrangements described may in all cases be used for the purposes of reproducing pictures and many modifications are possible, all of which are within the scope of this invention.

I claim:

1. Television, cinematograph and the like apparatus operating by dividing an object optically into strips and forming a plurality of images of each of said strips and having optical means comprising three systems of cylindrical lenses, said systems being arranged in spaced relation along the optical axis of said apparatus, one of said systems being an echelon device comprising a plurality of cylindrical lenses arranged with their axes spaced apart and parallel to one another, another of said systems comprising a plurality of cylindrical lenses and the other said system comprising a cylindrical lens, the lenses of said echelon device and the lenses of the second mentioned system having their axes parallel to one another and co-operating in focussing, in one direction, multiple images of strips of said object, said multiple images being equal in number to the number of lenses in said second system and the lens of the third mentioned system taking part in focussing an image of said object close to the entrant surface of said echelon device.

2. Television, cinematograph and the like apparatus operating by dividing an object optically into strips and forming a plurality of images of each of said strips and having optical means comprising three systems of cylindrical lenses, said systems being arranged in spaced relation along the optical axis of said apparatus, one of said systems being an echelon device comprising a plurality of cylindrical lenses at least equal in number to the number of said strips and arranged with their axes spaced apart but parallel to one another, another of said systems comprising cylindrical lenses equal in number to the number of said images and the other said system comprising a cylindrical lens, the lenses of said echelon device and the lenses of said second mentioned system having their axes parallel to one another and co-operating in focussing, in one direction, multiple images of strips of said object, said multiple images being equal in number to the number of lenses in said second system and the lens of the third mentioned system having its axis inclined with respect to the axes of the other said systems and taking part in focussing an image of said object close to the entrant surface of said echelon device.

3. Television, cinematograph and the like apparatus operating by dividing an object optically into strips and forming a plurality of images of each of said strips and having optical means comprising three systems of cylindrical lenses, said systems being arranged in spaced relation along the optical axis of said apparatus, one of said systems being an echelon device comprising a plurality of cylindrical lenses at least equal in number to the number of said strips and arranged with their axes spaced apart parallel to one another and in the same plane, another of said systems comprising cylindrical lenses equal in number to the number of said images and arranged with their axes spaced apart parallel to one another and lying in a plane parallel to the said plane of the axes of said echelon lenses, and the third said system comprising a cylindrical lens, the lenses of said echelon device and the lenses of the second mentioned system having their axes parallel to one another and co-operating in focussing, in one direction, multiple images of strips of said object, said multiple images being equal in number to the number of lenses in said second system and the lens of the third mentioned system taking part in focussing an image of said object close to the entrant surface of said echelon device.

GEORGE WILLIAM WALTON.